United States Patent
Mullins et al.

(10) Patent No.: US 8,839,858 B2
(45) Date of Patent: Sep. 23, 2014

(54) DRILLING WELLS IN COMPARTMENTALIZED RESERVOIRS

(75) Inventors: Oliver C. Mullins, Ridgefield, CT (US); Shahid A. Haq, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 625 days.

(21) Appl. No.: 12/993,164

(22) PCT Filed: Apr. 23, 2009

(86) PCT No.: PCT/US2009/041492
§ 371 (c)(1),
(2), (4) Date: Nov. 17, 2010

(87) PCT Pub. No.: WO2009/142868
PCT Pub. Date: Nov. 26, 2009

(65) Prior Publication Data
US 2011/0061935 A1    Mar. 17, 2011

Related U.S. Application Data

(60) Provisional application No. 61/055,765, filed on May 23, 2008.

(51) Int. Cl.
*E21B 49/00* (2006.01)
*E21B 7/00* (2006.01)
*E21B 7/04* (2006.01)
*E21B 47/022* (2012.01)

(52) U.S. Cl.
CPC ............... *E21B 7/04* (2013.01); *E21B 47/022* (2013.01)
USPC ............................ 166/255.2; 175/45; 175/50

(58) Field of Classification Search
USPC ................. 166/255.1, 255.2, 313, 50, 117.5, 166/241.6, 241.4; 175/50, 57, 45, 61, 107, 175/26, 73, 76, 325.1, 325.5
See application file for complete search history.

(56) References Cited

U.S. PATENT DOCUMENTS

| | | |
|---|---|---|
| 5,113,953 A | 5/1992 | Noble |
| 5,265,682 A | 11/1993 | Russell et al. |
| 5,520,255 A | 5/1996 | Barr et al. |
| 5,553,678 A | 9/1996 | Barr et al. |
| 5,553,679 A | 9/1996 | Thorp |

(Continued)

FOREIGN PATENT DOCUMENTS

| | | |
|---|---|---|
| CN | 1648410 A | 8/2005 |
| CN | 1676874 | 10/2005 |

(Continued)

OTHER PUBLICATIONS

Office Action of Chinese Patent Application No. 200980118876.3 dated Nov. 5, 2012: pp. 1-3.

(Continued)

*Primary Examiner* — Daniel P Stephenson
(74) *Attorney, Agent, or Firm* — Cathy Hewitt

(57) ABSTRACT

Method of drilling a well, including one method comprising determining a first value indicative of a relative position of a geological bed boundary with respect to a drilling assembly, determining a second value indicative of an optical property of a formation fluid proximate the drilling assembly, and controlling a well trajectory based on the first and second value.

20 Claims, 5 Drawing Sheets

(56) References Cited

U.S. PATENT DOCUMENTS

| | | |
|---|---|---|
| 5,582,259 A | 12/1996 | Barr |
| 5,603,385 A | 2/1997 | Colebrook |
| 5,673,763 A | 10/1997 | Thorp |
| 5,678,643 A * | 10/1997 | Robbins et al. ............... 175/45 |
| 5,685,379 A | 11/1997 | Barr et al. |
| 5,695,015 A | 12/1997 | Barr et al. |
| 5,706,905 A | 1/1998 | Barr |
| 5,778,992 A | 7/1998 | Fuller |
| 5,803,185 A | 9/1998 | Barr et al. |
| 5,971,085 A | 10/1999 | Colebrook |
| 6,089,332 A | 7/2000 | Barr et al. |
| 6,092,610 A | 7/2000 | Kosmala et al. |
| 6,158,529 A | 12/2000 | Dorel |
| 6,206,108 B1 * | 3/2001 | MacDonald et al. ........... 175/24 |
| 6,244,361 B1 | 6/2001 | Comeau et al. |
| 6,364,034 B1 | 4/2002 | Schoeffler |
| 6,394,193 B1 | 5/2002 | Askew |
| 6,401,842 B2 | 6/2002 | Webb et al. |
| 6,516,898 B1 | 2/2003 | Krueger |
| 7,093,672 B2 | 8/2006 | Seydoux et al. |
| 7,172,038 B2 * | 2/2007 | Terry et al. ................... 175/45 |
| 7,195,062 B2 * | 3/2007 | Cairns et al. ............... 166/255.2 |
| 7,303,007 B2 * | 12/2007 | Konschuh et al. ....... 166/250.01 |
| 7,413,032 B2 * | 8/2008 | Krueger ........................ 175/61 |
| 7,546,209 B2 * | 6/2009 | Williams ........................ 702/9 |
| 7,571,644 B2 * | 8/2009 | Ibrahim et al. ............. 73/152.55 |
| 7,677,307 B2 * | 3/2010 | Vasques et al. ............... 166/264 |
| 8,230,916 B2 * | 7/2012 | Sumrall et al. ........... 166/250.01 |
| 8,442,769 B2 * | 5/2013 | Phillips et al. .................... 702/6 |
| 2001/0052428 A1 | 12/2001 | Larronde et al. |
| 2003/0160164 A1 | 8/2003 | Jones et al. |
| 2004/0055745 A1 * | 3/2004 | Georgi et al. ............ 166/250.02 |
| 2004/0065477 A1 * | 4/2004 | Paulk et al. ..................... 175/50 |
| 2005/0199393 A1 | 9/2005 | Goldberg et al. |
| 2006/0011385 A1 | 1/2006 | Seydoux et al. |
| 2008/0066534 A1 | 3/2008 | Reid et al. |
| 2009/0166037 A1 * | 7/2009 | Sroka ........................... 166/264 |
| 2010/0175886 A1 * | 7/2010 | Bohacs et al. ................ 166/369 |
| 2010/0307769 A1 * | 12/2010 | Briquet et al. ............... 166/386 |
| 2011/0042071 A1 * | 2/2011 | Hsu et al. ................. 166/250.01 |
| 2011/0180327 A1 * | 7/2011 | Bittar et al. ..................... 175/61 |
| 2012/0188091 A1 * | 7/2012 | Calleja et al. ............. 340/854.1 |
| 2013/0168085 A1 * | 7/2013 | Fraser ..................... 166/250.01 |

FOREIGN PATENT DOCUMENTS

| | | |
|---|---|---|
| CN | 2793324 Y | 7/2006 |
| CN | 1869400 | 11/2006 |
| CN | 1932238 A | 3/2007 |
| CN | 1995691 A | 7/2007 |
| EP | 1898044 | 3/2008 |

OTHER PUBLICATIONS

International Search Report and Written Opinion issued in PCT/US2009/041492 on Nov. 18, 2009, 6 pages.

* cited by examiner

DRILLING WELLS IN COMPARTMENTALIZED RESERVOIRS

CROSS-REFERENCE TO RELATED APPLICATIONS

This application is a national stage entry of PCT Patent Application No. PCT/US2009/041492, filed Apr. 23, 2009, which claims priority to U.S. Provisional Application 61/055,765, filed May 23, 2008, the disclosures of which are hereby incorporated herein by reference.

BACKGROUND OF THE DISCLOSURE

FIG. 1 illustrates an example environment for the performance of a method of placing a production or development well 210 into an earth formation F. In the illustrated example, the earth formation F comprises a first shale deposit or bed 230, a tight sand deposit or bed 231, and a second shale deposit or bed 232. The beds 230, 231 and 232 are located on top of a reservoir R. The reservoir R includes a first porous sandstone bed or reservoir compartment 233, and an intermediate shale bed 234 separating the first reservoir compartment 233 from a second sandstone bed or reservoir compartment 236. In this example, the first compartment 233 contains a first hydrocarbon, and the second compartment 236 contains a second hydrocarbon as well as water. The interface between the hydrocarbon and the water is indicated by an oil water contact (OWC) 235. The earth formation F also comprises a fault 240 across which the geological structures are not continuous. Beds 230', 231', 232', 233', 234' and 236' correspond to similar beds 230, 231, 232, 233, 234 and 236 across the fault 240. Similarly, an OWC 235' corresponds to OWC 235.

In the method depicted in FIG. 1, a first pilot or exploration well 220 is initially drilled through the formation F. As the well 220 is being drilled, logging while drilling measurements indicative of the physical properties of the porous rock immediately surrounding the well 220 are acquired. These measurements may typically include natural gamma ray and resistivity measurements, as well as other types of measurements known by those skilled in the art. Additionally, or alternatively, the drill string used to drill the well 220 may be removed from the well 220 and a wireline-conveyed tool string may be introduced into the well 220 to acquire measurements indicative of the physical properties of the porous rock immediately surrounding the well 220. Typical operations performed by the wireline-conveyed tool string may include pressure measurements, formation fluid sample collections and sidewall core collections, as well as other types of measurements and/or collections known by those skilled in the art. The measurements collected while drilling and/or with a wireline tool string are interpreted and used to identify, for example, a location of the top of the reservoir 236, a type and/or economical value of the hydrocarbon contained in the beds 233 and 234, and a location of the OWC 235, among other things. Based on this and optionally other information, a drill string is introduced in the well 220 for a side-tracking well 210. The well 210 is typically a horizontal well located at a depth that maximizes the economical value of the expected production from the well 210. The well 210 may be steered geometrically along a predetermined trajectory using periodical measurement of the tilt of the bottom hole assembly, or geologically with respect to the boundary between the beds 232 and 233 using, for example, deep resistivity images of the formation encountered by the bottom hole assembly used to drill the well 210.

As shown in FIG. 1, as the well 210 is being drilled in bed 233, it may cross the fault 240. In some cases, such as when the fault 240 is permeable, the type and/or economical value of the formation fluid present in the bed 236' is similar to the type and/or economical value of the hydrocarbon present in the bed 233. However, in other cases, the type and/or economical value of the formation fluid present in the bed 236' is unknown and can not be inferred from measurements collected while drilling the pilot well 220. For example, the type and/or economical value of the formation fluid present in the bed 236' may be significantly lower than in the bed 233. Thus, the depth or trajectory of the well 210, selected based on the knowledge of the reservoir fluid along the well 220, may not lead to a sufficient economical value of the well 210 past the fault 240. Further, even horizontal variations of the hydrocarbon in the bed 233 may exist. The compositional variations may require updating the trajectory 210 to increase its economical value.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
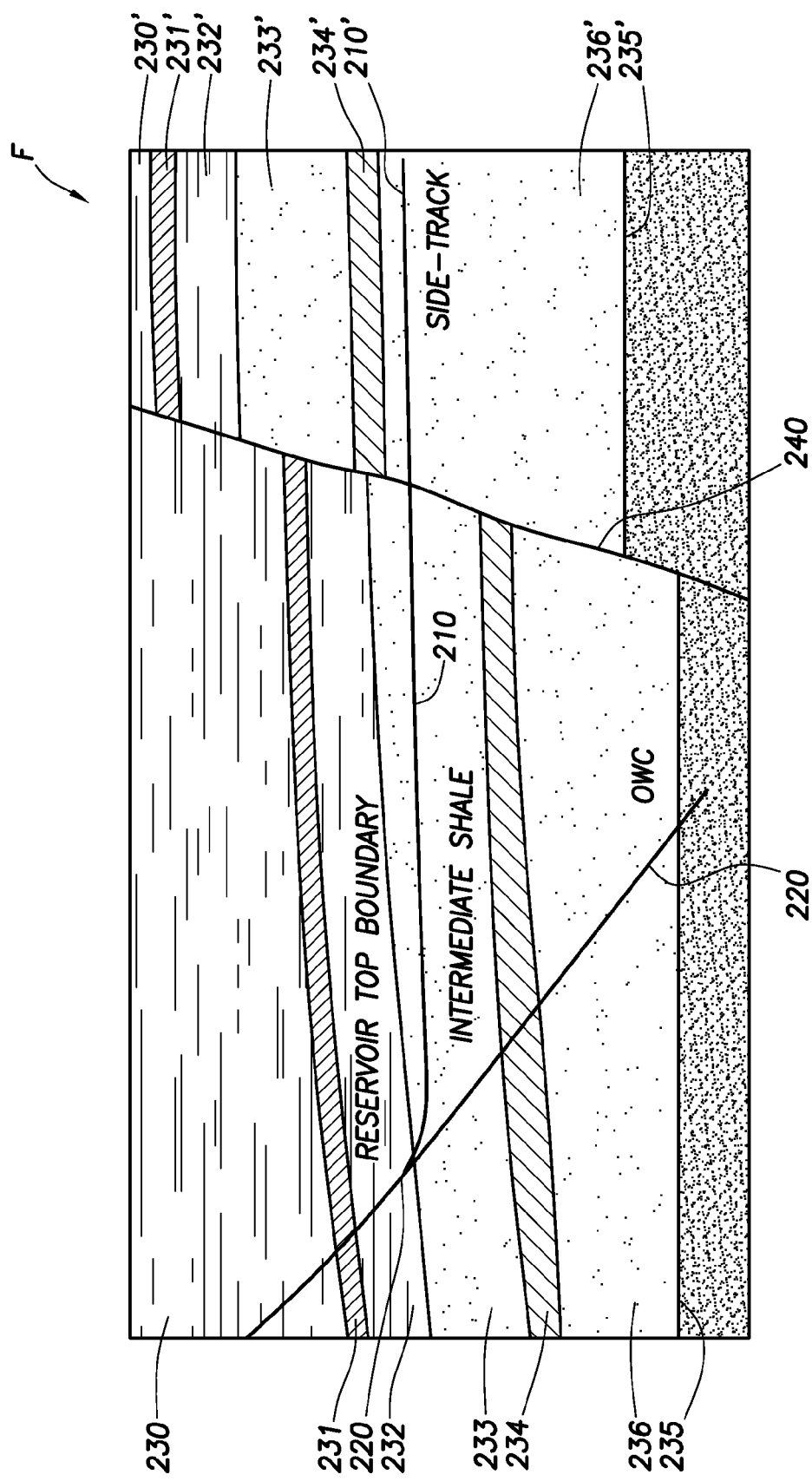
FIG. 1 is a cross-sectional view of a typical formation.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

One or more aspects of the methods and apparatus within the scope of the present disclosure may be implemented to use measurements indicative of a relative position of geological bed boundaries with respect to a drilling assembly together with measurements indicative of a methane concentration in the formation fluid to control a well trajectory. Methods and apparatus within the scope of the present disclosure may alternatively or additionally be implemented to use measurements indicative of a relative position of geological bed boundaries with respect to a drilling assembly together with measurements indicative of a formation fluid optical property to control a well trajectory. One or more aspects of the methods and apparatus within the scope of the present disclosure may also or alternatively be used to identify compartmentalization as a well is being drilled and/or to steer a well based on the identified compartmentalization.

Figure 2:
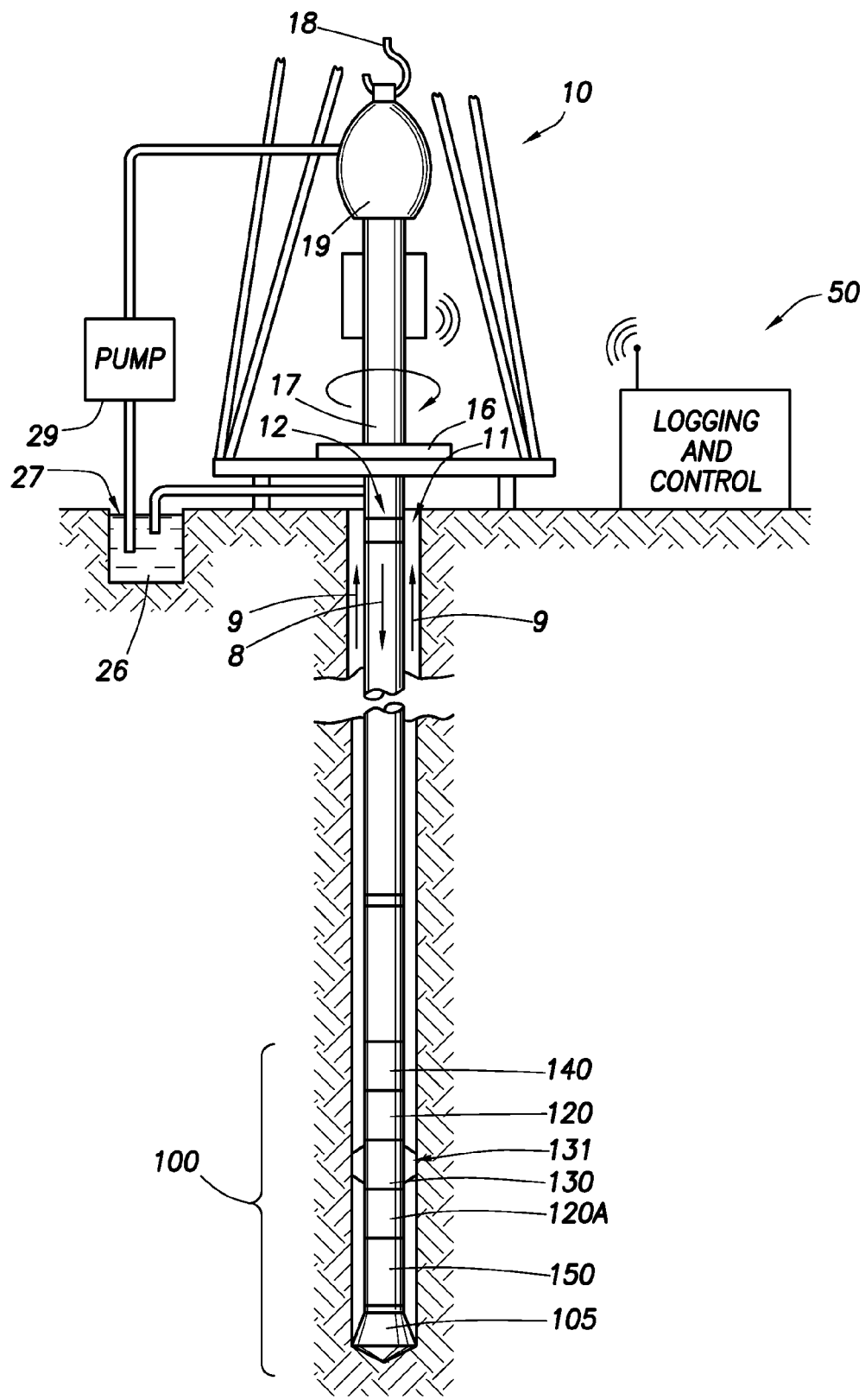
FIG. 2 is a schematic view of apparatus according to one or more aspects of the present disclosure.

FIG. 2 is a schematic view of an exemplary drilling system 50 according to one or more aspects of the present disclosure. The drilling system 50 can be onshore or offshore. In the exemplary embodiment shown in FIG. 2, a borehole 11 is formed in one or more subsurface formations by rotary drilling in a manner that is well known. However, implementations within the scope of the present disclosure may also or alternatively use directional drilling.

A drill string 12 suspended within the borehole 11 comprises a bottom hole assembly 100 which includes a drill bit 105 at its lower end. The surface system includes a platform and derrick assembly 10 positioned over the borehole 11, wherein the assembly 10 comprises a rotary table 16, a kelly 17, a hook 18, and a rotary swivel 19. The drill string 12 is rotated by the rotary table 16, energized by means not shown, which engages the kelly 17 at the upper end of the drill string 12. The drill string 12 is suspended from the hook 18 attached to a traveling block (not shown) through the kelly 17 and the rotary swivel 19, which permits rotation of the drill string 12 relative to the hook 18. A top drive system could alternatively or additionally be used.

In the illustrated example implementation, the surface system further comprises drilling fluid or mud 26 stored in a pit 27 located near the well site. A pump 29 delivers the drilling fluid 26 to the interior of the drill string 12 via a port in the swivel 19, causing the drilling fluid to flow downward through the drill string 12 as indicated by a directional arrow 8. The drilling fluid exits the drill string 12 via ports in the drill bit 105, and then circulates upward through the annulus region between the outside of the drill string 12 and the wall of the borehole, as indicated by directional arrows 9. In this well known manner, the drilling fluid 26 lubricates the drill bit 105 and carries formation cuttings up to the surface as it is returned to the pit 27 for recirculation.

The bottom hole assembly 100 of the illustrated example implementation includes a plurality of logging-while-drilling (LWD) modules 120, 120A, a sampling-while-drilling (SWD) module 130, a measurement-while-drilling (MWD) module 140, a rotary-steerable system and motor 150 (e.g., a directional drilling subsystem), and the drill bit 105.

Use of the example methods and apparatus described herein may be in conjunction with controlled steering or "directional drilling" using the rotary-steerable subsystem 150. Directional drilling is the intentional deviation of the wellbore from the path it would naturally take. In other words, directional drilling is the steering of the drill string so that it travels in a desired direction. Directional drilling comprises geometrical steering, in which the drill bit is typically steered along a pre-determined path in an Earth formation, and geological steering, in which the drill bit is typically steered relative to geological features of the Earth formation. Directional drilling may be advantageous in offshore drilling because, for example, it may enable many wells to be drilled from a single platform. Directional drilling may also enable horizontal drilling through a reservoir. Horizontal drilling may enable a longer length of the wellbore to traverse the reservoir, which may increase the production rate from the well. A directional drilling system may also be used in vertical drilling operations. Often the drill bit 105 will veer off of a planned drilling trajectory because of the unpredictable nature of the formations being penetrated or the varying forces that the drill bit 105 experiences. When such a deviation occurs, a directional drilling system (e.g., the rotary-steerable subsystem 150) may be used to put the drill bit 105 back on course.

A known method of directional drilling includes the use of a rotary steerable system ("RSS"). In an RSS, the drill string 12 is rotated from the surface, and downhole devices cause the drill bit 105 to drill in the desired direction. Rotating the drill string 12 greatly reduces the occurrences of the drill string 12 getting hung up or stuck during drilling. Rotary steerable drilling systems for drilling deviated boreholes into the earth may be generally classified as either "point-the-bit" systems or "push-the-bit" systems. In point-the-bit systems, the axis of rotation of the drill bit 105 is deviated from the local axis of the bottom hole assembly 100 in the general direction of the new hole. The hole is propagated in accordance with the customary three point geometry defined by upper and lower stabilizer touch points and the drill bit 105. The angle of deviation of the drill bit 105 axis coupled with a finite distance between the drill bit 105 and a lower stabilizer results in the non-collinear condition required for a curve to be generated. There are many ways in which this may be achieved, including a fixed bend at a point in the bottom hole assembly 100 close to the lower stabilizer, or a flexure of the drill bit 105 drive shaft distributed between an upper and the lower stabilizer. In its idealized form, the drill bit 105 is not required to cut sideways because the bit axis is continually rotated in the direction of the curved hole. Examples of point-the-bit type rotary steerable systems and their operation are described in U.S. Patent Application Publication No. 2001/0052428 and U.S. Pat. Nos. 6,401,842; 6,394,193; 6,364,034; 6,244,361; 6,158,529; 6,092,610; and 5,113,953, all of which are hereby incorporated herein by reference in their entireties.

In push-the-bit rotary steerable systems, there is usually no specially identified mechanism to deviate the bit axis from the local bottom hole assembly axis. Instead, the requisite non-collinear condition is achieved by causing either or both of upper and lower stabilizers to apply an eccentric force or displacement in a direction that is preferentially orientated with respect to the direction of hole propagation. There are many ways in which this may be achieved, including non-rotating (with respect to the hole) eccentric stabilizers (displacement based approaches) and eccentric actuators that apply force to the drill bit in the desired steering direction. Steering is achieved by creating non co-linearity between the drill bit 105 and at least two other touch points. In some instances, the drill bit 105 is required to cut sideways to generate a curved hole. Examples of push-the-bit type rotary steerable systems and their operation are described in U.S. Pat. Nos. 5,265,682; 5,553,678; 5,803,185; 6,089,332; 5,695,015; 5,685,379; 5,706,905; 5,553,679; 5,673,763; 5,520,255; 5,603,385; 5,582,259; 5,778,992; and 5,971,085, all of which are hereby incorporated herein by reference in their entireties.

The MWD module 140 is housed in a special type of drill collar, as is known in the art, and can comprise one or more devices for measuring characteristics of the drill string 12 and drill bit 105. The MWD module 140 further comprises an apparatus (not shown) configured to generate electrical power delivered to the downhole system. This may include a mud turbine generator powered by the flow of the drilling fluid. However, other power and/or battery systems may also or alternatively be employed. The MWD module 140 may comprise one or more of measuring devices configured to measure weight-on-bit, torque, vibration, shock, stick-slip, direction, and/or inclination. The MWD module 140 may also comprise capabilities for communicating with surface equipment.

The LWD modules 120, 120A are housed in a special type of drill collar, as is known in the art, and can comprise one or a plurality of known types of logging tools. The LWD modules 120, 120A may be configured to measure, process and/or store information, and to communicate with the MWD module 140. The LWD modules 120, 120A may be used to implement a resistivity array having a modular design. For example, each LWD module 120, 120A may be used to implement a resistivity module with at least one antenna that can function as a transmitter or a receiver, wherein the LWD modules 120, 120A are spaced apart on a drill string and separated by at least one downhole tool (e.g., the SWD module 130). Each LWD module 120, 120A may comprise at least one antenna coil with a magnetic moment orientation not limited to the tool longitudinal direction. A spacing between the transmitter and receiver modules may be selected based on expected reservoir thickness. Embodiments within the scope of the present disclosure may also comprise more than two LWD tools, including more that two LWD tools each having an antenna.

The LWD modules 120, 120A may be used to implement a geosteering method while drilling the formation by generating a plurality of formation models for the formation, where each of the plurality of the formation models includes a set of parameters and a resistivity tool therein and locations of the resistivity tool differ in the plurality of the formation models. Such method may also include computing predicted tool responses for the resistivity tool in the plurality of formation models, acquiring resistivity measurements using the resistivity tool in the formation with the resistivity modules 120, 120A, and determining an optimum formation model based on a comparison between the actual tool response and the predicted tool responses. The method may further include steering a bottom hole assembly based on the optimum formation model.

Figure 4A:
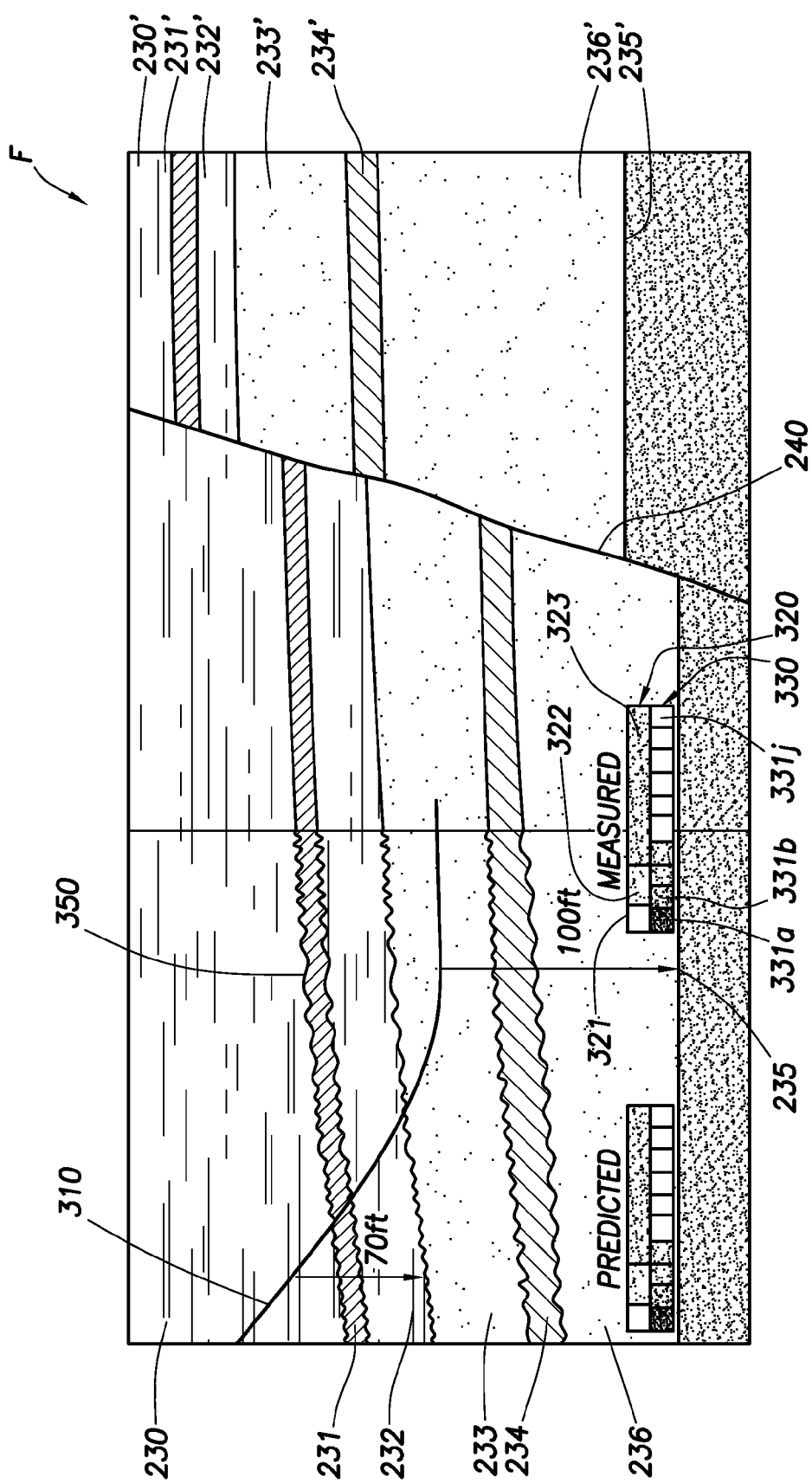
FIGS. 4A and 4B are schematic views of a log according to one or more aspects of the present disclosure.

The resistivity measurements collected by the resistivity modules 120, 120A may be inverted using a Bayesian method. For example, as a well is being drilled (e.g., the well 310 depicted in FIGS. 4A and 4B), the measurements acquired by the LWD modules 120, 120A may be utilized to compute a plurality of probability curves (see, e.g., probability curve 350 in FIG. 4A, represented in superposition to the geological structure of the formation F). The probability curves may express the magnitude of the probability of a geological bed boundary as a function of a relative position with respect to the drilling assembly 100. Thus, the local maxima of any probability curve may be indicative of a relative position of a geological bed boundary with respect to the drilling assembly 100 and/or the drilled well (e.g., the well 310). In addition, the resistivity modules 120, 120A may be configured to be capable of detecting a fault (e.g., the fault 240).

Further, the resistivity measurements collected by the resistivity modules 120, 120A may be configured to determine one or more components of the resistivity tensor of the beds delimited by the bed boundaries. Thus, the measurements acquired by the resistivity modules 120, 120A may be used to identify resistivity contrast in a bed, such as observable at an oil-water contact (e.g., oil-water contacts 235, 235').

Examples of resistivity imaging tools and methods of use may be found in U.S. Patent Publication No. 2006/0011385 and U.S. Pat. No. 7,093,672, each hereby incorporated herein by reference in their entireties.

The SWD module 130 may comprise a probe 131 configured to be selectively extended into sealing contact with the wall of the wellbore 11. In the extended position, the probe 131 is configured to establish fluid communication between a flow line in the SWD module 130 and the formation. A pump (not shown) disposed in the SWD module 130 may be energized for extracting fluids from the formation into the flow line. After mud filtrate has been extracted from the formation immediately surrounding the wellbore 11, pristine formation fluid is drawn into SWD module 130. A plurality of sensors may be disposed on the flowline in the SWD module 130 and configured to aid in determining a value indicative of a methane concentration in the formation fluid, a value indicative of a formation fluid optical property, and/or a property of a hydrocarbon in the compartment, among other values and/or characteristics.

Figure 3:
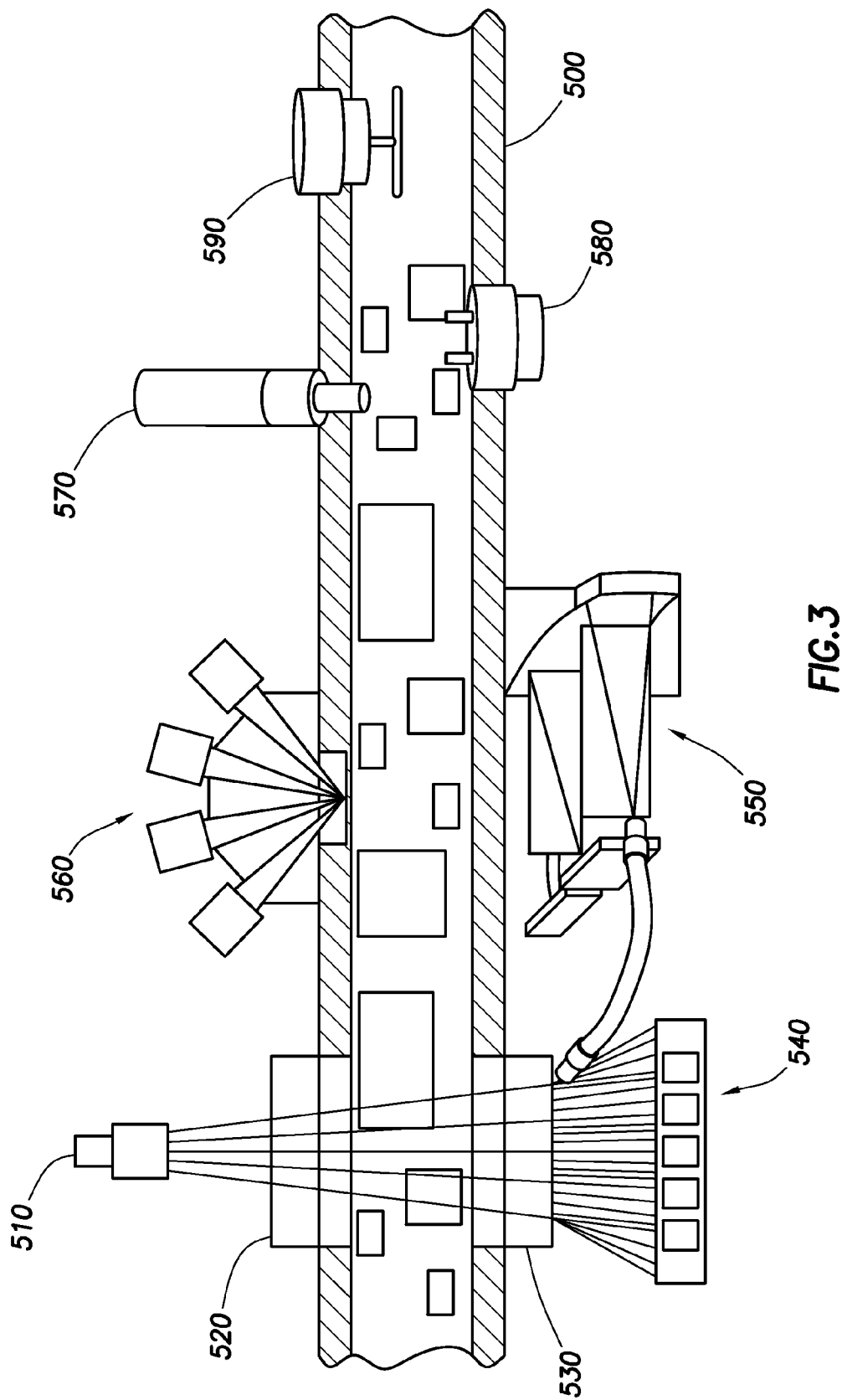
FIG. 3 is a schematic view of apparatus according to one or more aspects of the present disclosure.

A schematic view of an exemplary flow line 500 disposed in the SWD module 130 is shown in FIG. 3. The flow line 500 is equipped with a first light source 510 configured to emit light in the visible and/or NIR range. The light is directed toward the fluid extracted from the formation and circulating in the flow line 500 through an optical window 520. The light emerging from the fluid through a second optical window 530 is directed towards one or more optical spectrometers (e.g., a filter spectrometer 540 and a grating spectrometer 550).

The optical density (OD) of the fluid may be determined at one or more preselected wavelengths. One example of measurement collected by the filter spectrometer 540 is illustrated by the spectrum log 330 of FIG. 4A. The spectrum 330 includes a visual representation of the measured optical densities 331$a$, 331$b$, 331$j$ corresponding to preselected wavelengths in the visible and NIR range, and preselected wavelength widths. The spectrum log 330 comprises a plurality of bars, the thickness of which represents the amplitude of the measured OD for each of the wavelengths on, for example, a scale between 0 and 5. In the example shown in FIG. 4A, the analyzed fluid has a large measured OD 331$a$, 331$b$, and a low measured density 331$j$. In addition, these optical densities, and optionally the OD measured by the grating spectrometer 550, may be used to determine a partial composition 320. In the shown example, the composition 320 comprises a weight percentage of methane 321, a weight percentage of the lumped group comprising ethane, propane, and butanes, and a weight percentage of the lumped group comprising hexane and hydrocarbon molecules having more than 6 carbon atoms in the molecule. Other compositions (not shown) may also include the weight percent of carbon dioxide and/or water, among others.

Still referring to FIG. 3, the flow line 500 may also be equipped with a second light source 560 configured to emit an essentially monochromatic light beam in the UV range. The light is directed toward the sampled fluid at one or more incident angles. The reflected light may be also measured at one or more reflected angles to, for example, determine the presence of gas and/or emulsion in the fluid flowing through the flow line 500. Fluorescent light may also be measured at wavelengths different from the emitted light. The flow line 500 may also be equipped with a pressure and temperature gauge (e.g., a quartz gauge) 570, a resistivity cell 580, and a density and viscosity sensor 590. The density and viscosity sensor 590 may be configured to analyze the resonance frequency of a rod vibrating in the flow line 500.

Figure 4B:
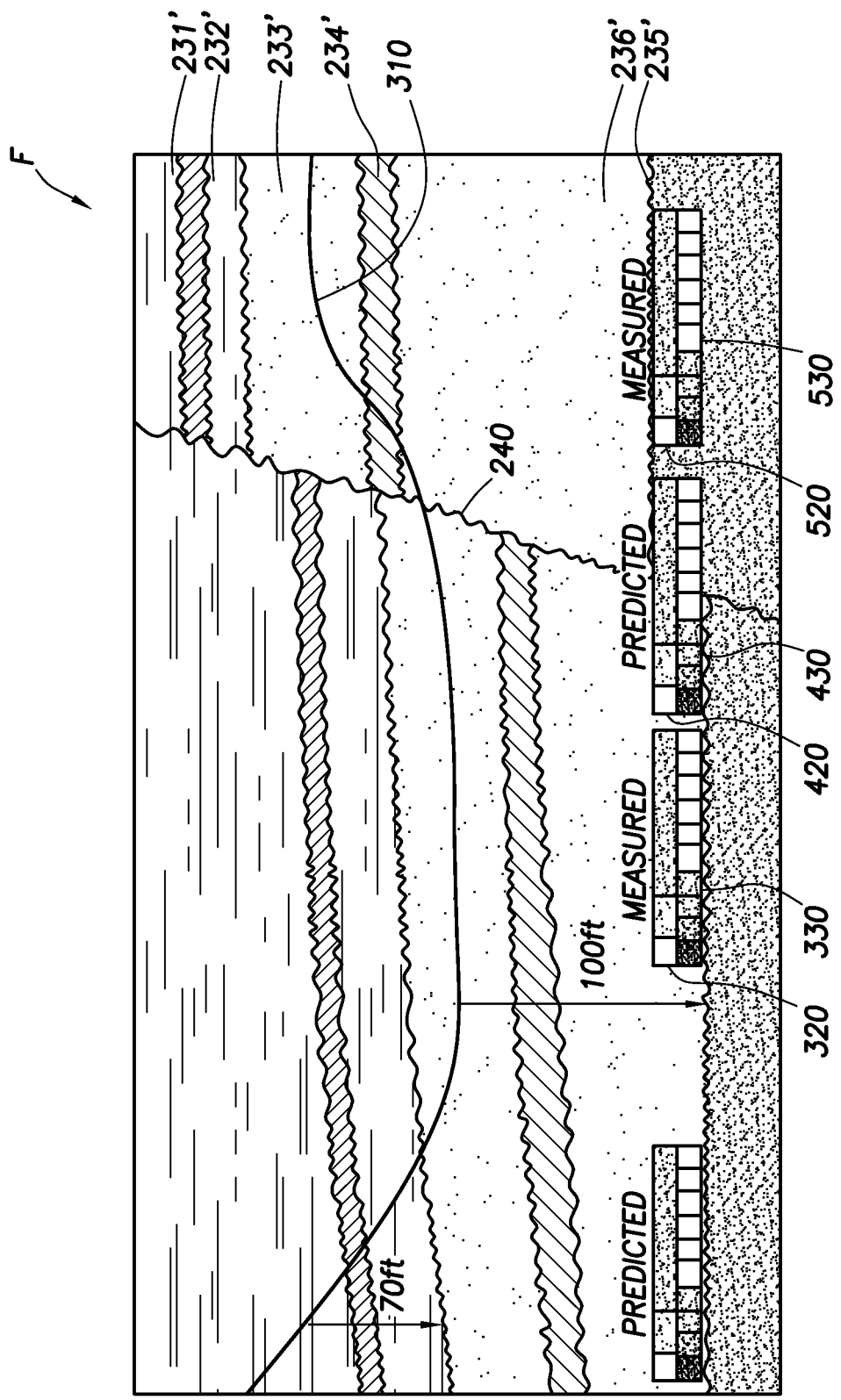

FIGS. 4A and 4B depict aspects of obtaining a new well trajectory 310 in the formation F of FIG. 1 using the drilling system 50 of FIG. 2. FIGS. 4A and 4B represent the formation F of FIG. 1, using like or identical reference numbers to identify common or similar geological structures present in FIG. 1. As shown, the well 310 is drilled from left to right.

In contrast to the method depicted in FIG. 1, a pilot well 220 is not required to determine the top of the reservoir (e.g., the boundary between beds 232 and 233). Indeed, by utilizing the measurements provided by the resistivity modules 120, 120A, the top of the reservoir may be identified even if the BHA 100 is located, for example, 70 feet away from the top of the reservoir. The curves 350 may be used to determine the distance between the BHA 100 and geological boundaries. The inverted components of the resistivity sensor corresponding to the beds 230, 231, 232 and 233 may be used to distinguish between shales, tight sandstones and oil bearing porous sandstones. Thus, as the top of the reservoir is identified, the trajectory of the well 310 may be altered to land the well horizontally in the bed 233.

Also in contrast to the method illustrated in FIG. 1, a pilot well 220 is not required to determine the OWC 235 and/or the intermediate shale 234. Indeed, by utilizing the measurements provided by the resistivity modules 120, 120A, the OWC 235 may be identified even if the BHA 100 is located, for example, 100 feet away from the top of the reservoir.

Once the well 310 has been landed in the bed 233, a sampling operation may be initiated. The relative location of the bottom hole assembly with respect to the geological boundaries may be used to initiate fluid sampling and analysis operations based on the detection that a geological boundary has been crossed. Fluid extraction operations may require the drilling operation to be momentarily stopped so that a sampling probe 131 may establish an exclusive fluid communication with the formation F. Fluid extraction may then be initiated by the SWD module 130, and may last approximately 30 minutes or more in order to extract mud filtrate from the formation and subsequently obtain pristine reservoir fluid in the sampling tool. During this time, the BHA 100 is not rotated, increasing thereby the risk that the BHA may stick to the formation. It may be therefore beneficial in some cases to limit the number of locations at which the SWD module 130 is used. For example, these locations may be selected based on the relative location of the bottom hole assembly with respect to the geological boundaries, such as once a geological boundary has been crossed, among other considerations.

The drilling system 55 of FIG. 2 may allow more complete characterization of the reservoir compartment 233. For example, a hydrocarbon reservoir compartment may be identified by determining (1) the relative locations of the geological boundary of the compartment with respect to the well, and (2) at least one property of a hydrocarbon in the compartment. By analyzing the formation fluid extracted from the compartment 233 using one or more of the sensors shown in FIG. 3, a spectral signature (e.g., optical signature and/or NMR signature) of the fluid may be used to distinguish between a dry gas bearing compartment, a wet gas bearing compartment, a gas condensate retrograde bearing compartment, a volatile oil bearing compartment, a non volatile oil bearing compartment, and a heavy oil bearing compartment. For example, the spectral signature measured may be provided to a surface operator in the form of an optical density in the visible range (oil color), a partial composition (e.g., the partial composition 320), and/or a GOR. Thus, as the well 310 is landed in the compartment 233, the drilling system 55 may be used to compare fluid properties expected from, for example, prior knowledge of the formation F (e.g., via offset wells). If the measured property does not match the expected property, the trajectory of the well 310 may be altered to, for example, intersect the compartment 136. Additional measurements may be performed in a same compartment to, for example, detect horizontal composition gradients in the compartment. The drilling system 55 may in turn be used to adjust the drilling direction of the well 310 in response to a detected horizontal composition gradient to, for example, increase or decrease the distance separating the well 310 and the top of the reservoir.

As shown in FIG. 4B, the well 310 may eventually cross the fault 240. The fault 240 may be detected from measurements acquired with the resistivity modules 120, 120A. However, in some cases, the resistivity modules 120, 120A may measure components of the resistivity tensor in the compartment 234' having similar values as the measured components of the resistivity tensor in the compartment 233. Once a new compartment is being drilled, the SWD module 130 may be used to investigate the compartment using downhole fluid analysis (DFA). In the shown example, the fluid in the compartment 234' may have the expected partial composition 420 and the optical spectrum 430, both based on measurements performed in the compartment 233. However, the measured properties may indicate a different oil as illustrated by measured partial composition 520 and optical spectrum 530. Based on this information, as well as the detected geological boundaries, the well 310 may then be steered away from the oil-water contact and towards the compartment 233'. Once the well is landed in the compartment 233', a new downhole fluid analysis operation may be performed.

In view of all of the above and the Figures, those skilled in the pertinent art should readily recognize that the present disclosure introduces a method of drilling a well, comprising determining a first value indicative of a relative position of a geological bed boundary with respect to a drilling assembly, determining a second value indicative of a methane concentration of a formation fluid proximate the drilling assembly, and controlling a well trajectory based on the first and second values. The first value may be obtained with an electro-magnetic propagation while drilling tool, an electrical induction while drilling tool, and/or an acoustic while drilling tool. The second value may be obtained with a sampling while drilling tool, a near infrared (NIR) spectrometer, a nuclear magnetic resonance (NMR) spectrometer, and/or at least one of a mass spectrometer and a gas chromatograph. The second value may comprise a gas-oil ratio (GOR).

Another method introduced in the present disclosure comprises determining a first value indicative of a relative position of a geological bed boundary with respect to a drilling assembly, determining a second value indicative of an optical property of a formation fluid proximate the drilling assembly, and controlling a well trajectory based on the first and second value. The optical property of the formation fluid may be an absorption at one or more wavelengths, wherein the one or more wavelengths may be at least partially in at least one of the visible range and the near infrared (NIR) range. The optical property of the formation fluid may be a fluorescence intensity at one or more wavelengths, wherein the one or more wavelengths may be at least partially in the UV range. The optical property of the formation fluid may be a reflection intensity at one or more incidence angles at an interface between the formation fluid and a light transmitting window.

The present disclosure also introduces a method of drilling a well comprising identifying a hydrocarbon reservoir compartmentalization by determining at least one relative location of a geological boundary of the compartment with respect to the well and at least one property of a hydrocarbon in the compartment. Such method further comprises adjusting a well trajectory based on the determined compartmentalization.

The present disclosure also introduces a method of evaluating a formation penetrated by a well, comprising lowering a drilling apparatus in the formation, wherein the drilling apparatus comprises a drilling assembly, an imaging tool, and a fluid sampling tool. The imaging tool is used to determine at least one relative location of a geological boundary of a compartment with respect to the well. The drilling assembly is used to extend the well beyond the determined geological boundary. The fluid sampling tool is used to extract fluid from the formation located beyond the determined geological boundary. The method further comprises measuring a property of the extracted fluid using at least one of a density sensor, a viscosity sensor, and an optical sensor.

The present disclosure also introduces an apparatus comprising an imaging tool configured to determine at least one relative location of a geological boundary of a compartment with respect to a well penetrating a subterranean formation, a drilling assembly configured to extend the well beyond the determined geological boundary, a fluid sampling tool configured to extract fluid from the formation located beyond the determined geological boundary, and a sensor configured to measure a property of the extracted fluid.

The present disclosure also introduces an apparatus comprising means for determining a first value indicative of a relative position of a geological bed boundary with respect to a drilling assembly. Such apparatus also comprises means for determining a second value indicative of an optical property of a formation fluid proximate the drilling assembly, wherein the optical property is selected from the group consisting of: an absorption at one or more wavelengths; a fluorescence intensity at one or more wavelengths; and a reflection intensity at one or more incidence angles at an interface between the formation fluid and a light transmitting window. The apparatus further comprises means for controlling a well trajectory based on the first and second value. The optical property of the formation fluid may be selected from the group consisting of: an absorption at one or more wavelengths at least partially in at least one of the visible range and the near infrared (NIR) range; and a fluorescence intensity at one or more wavelengths at least partially in the UV range.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A method of drilling a well, comprising:
   determining a first value indicative of a relative position of a geological bed boundary with respect to a drilling assembly;
   determining a second value indicative of a property of a formation fluid proximate the drilling assembly, wherein the second value is indicative of a methane concentration of the formation fluid proximate the drilling assembly, and wherein the second value comprises a gas-oil ratio (GOR); and
   controlling a well trajectory based on the first and second value.

2. The method of claim 1 wherein the property is an optical property of the formation fluid, and wherein the optical property of the formation fluid is an absorption at one or more wavelengths.

3. The method of claim 2 wherein the one or more wavelengths are at least partially in at least one of the visible range and the near infrared (NIR) range.

4. The method of claim 1 wherein the property is an optical property of the formation fluid, and wherein the optical property of the formation fluid is a fluorescence intensity at one or more wavelengths.

5. The method of claim 4 wherein the one or more wavelengths are at least partially in the UV range.

6. The method of claim 1 wherein the property is an optical property of the formation fluid, and wherein the optical property of the formation fluid is a reflection intensity at one or more incidence angles at an interface between the formation fluid and a light transmitting window.

7. The method of claim 1 wherein the first value is obtained with an electro-magnetic propagation while drilling tool.

8. The method of claim 1 wherein the first value is obtained with an electrical induction while drilling tool.

9. The method of claim 1 wherein the first value is obtained with an acoustic while drilling tool.

10. The method of claim 1 wherein the second value is obtained with a sampling while drilling tool configured to capture a portion of the formation fluid.

11. The method of claim 1 wherein the second value is obtained using a near infrared (NIR) spectrometer.

12. The method of claim 1 wherein the second value is obtained using a nuclear magnetic resonance (NMR) spectrometer.

13. The method of claim 1 wherein the second value is obtained using at least one of a mass spectrometer and a gas chromatographer.

14. The method of claim 1 further comprising:
    positioning a drilling apparatus in a well, the drilling apparatus having the drilling assembly, an imaging tool, and a fluid sampling tool, wherein determining the first value comprises using the imaging tool; and
    using the drilling assembly to extend the well beyond the determined geological bed boundary;
    wherein determining the second value comprises:
      using the fluid sampling tool to extract fluid from the geological bed located beyond the determined geological boundary; and
      measuring downhole a property of the extracted fluid using at least one of a density sensor, a viscosity sensor, and an optical sensor.

15. A method of drilling a well, comprising:
    positioning a drilling apparatus in a well, the drilling apparatus having a drilling assembly, an imaging tool, and a fluid sampling tool;
    determining a first value indicative of a relative position of a geological bed boundary with respect to the drilling assembly, wherein determining the first value comprises using the imaging tool;
    determining a second value indicative of a property of a formation fluid proximate the drilling assembly, wherein determining the second value comprises:
      using the fluid sampling tool to extract fluid from the geological bed located beyond the determined geological boundary; and
      measuring downhole a property of the extracted fluid using at least one of a density sensor, a viscosity sensor, and an optical sensor;
    controlling a well trajectory based on the first and second value; and
    using the drilling assembly to extend the well beyond the determined geological bed boundary.

16. A method of drilling a well, comprising:
determining a first value indicative of a relative position of a geological bed boundary with respect to a drilling assembly;
determining a second value indicative of a property of a formation fluid proximate the drilling assembly, wherein the second value comprises a gas-oil ratio (GOR); and
controlling a well trajectory based on the first and second value.

17. The method of claim 16 wherein the second value is obtained with a sampling while drilling tool configured to capture a portion of the formation fluid.

18. The method of claim 16 wherein the second value is obtained using a near infrared (NIR) spectrometer.

19. The method of claim 16 wherein the first value is obtained with an electro-magnetic propagation while drilling tool.

20. The method of claim 16 wherein the first value is obtained with an acoustic while drilling tool.

* * * * *